United States Patent [19]

Dinbergs

[11] 4,435,524

[45] Mar. 6, 1984

[54] PROCESS FOR PREPARING SPHERICAL AND POROUS VINYL RESIN PARTICLES

[75] Inventor: Kornelius Dinbergs, Broadview Heights, Ohio

[73] Assignee: The B. F. Goodrich Company, Akron, Ohio

[21] Appl. No.: 442,701

[22] Filed: Nov. 18, 1982

Related U.S. Application Data

[63] Continuation-in-part of Ser. No. 299,741, Sep. 8, 1981, Pat. No. 4,360,651, which is a continuation-in-part of Ser. No. 258,854, Apr. 29, 1981, abandoned, which is a continuation of Ser. No. 150,841, May 19, 1980, abandoned.

[51] Int. Cl.$^3$ .............................................. C08V 9/28
[52] U.S. Cl. ..................................... 521/65; 428/402; 521/56; 526/88; 526/209; 526/344.2; 526/344.3
[58] Field of Search ................... 526/88, 344.2, 344.3, 526/209, 202; 521/56, 65; 428/402

[56] References Cited

U.S. PATENT DOCUMENTS 4,360,651 11/1982 Dinbergs ............................. 521/65

Primary Examiner—Morton Foelak
Attorney, Agent, or Firm—Joe A. Powell; Alan A. Csontos

[57] ABSTRACT

Process for making porous, substantially spherical particles having high bulk density of vinyl polymers or resins by the use of the suspension polymerization technique. In the polymerization there is employed a water-insoluble dispersant comprised of a substantially unneutralized crosslinked interpolymer of one or more carboxylic acid monomers with a polyunsaturated compound having a plurality of terminally unsaturated polymerizable groups and a surfactant system comprising at least one surfactant selected from the group consisting of a polyethylene oxide containing surfactant and a non-polyethylene oxide containing surfactant. Excellent results are obtained when both a polyethylene oxide and a non-polyethylene oxide containing surfactant are used in the process of the invention. Rapid stirring or high agitation is used while employing a monomer-soluble free radical yielding polymerization catalyst.

24 Claims, No Drawings

4,435,524

PROCESS FOR PREPARING SPHERICAL AND POROUS VINYL RESIN PARTICLES

CROSS REFERENCE TO RELATED APPLICATIONS

This application is a continuation-in-part of U.S. patent application Ser. No. 299,741, filed Sept. 8, 1981, now U.S. Pat. No. 4,360,651, which is a continuation-in-part of U.S. patent application Ser. No. 258,854, filed Apr. 29, 1981, which is a continuation of U.S. patent application Ser. No. 150,841, filed May 19, 1980. U.S. patent application Ser. Nos. 258,854 and 150,841 are now abandoned.

Related applications for U.S. patent are Ser. No. 021,399, filed Mar. 19, 1979, now U.S. Pat. No. 4,229,547 in the names of Louis Cohen and Pijus K. Basu, and application for U.S. patent Ser. No. 151,060, filed May 19, 1980, now abandoned, in the name of Pijus K. Basu.

BACKGROUND OF THE INVENTION

Many polymerizable monomeric materials, and particularly vinyl chloride, are being polymerized today on a large scale commercially either in suspension media or in aqueous dispersion or emulsion, i.e., latex form, employing various colloidal suspension agents, emulsifiers or soaps, and/or synthetic detergent-type dispersing agents. In these methods of polymerization, and particularly in suspension polymerization, agitation (usually vigorous) is depended upon to suspend and/or disperse the monomer particles or droplets throughout the reaction media and to maintain such suspension or dispersion during the polymerization reaction and to assist in heat transfer to the reactor cooling surfaces. However, in most instances, polymer particles produced in accordance with these processes are not uniform in size and shape. In subsequent processing of these polymers, such as, for example, polyvinyl chloride (PVC), it is desirable to have uniform size and shape in the polymer particles.

Various polymerization processes and modifications of existing processes have been heretofore proposed to obtain uniform particle size. For example, one very successful method that has been proposed is that described in U.S. Pat. No. 3,620,988. In said method a monomeric material, such as vinyl chloride, of low solubility in water containing a monomer-soluble free radical type catalyst, is suspended as discrete droplets of a desired size in an aqueous medium thickened with a water-insoluble polymeric gellation agent which imparts plastic flow properties to such medium. The polymerization reaction is then carried out using a batch or continuous process under substantially quiescent conditions, that is, in the absence of turbulence or the absence of shearing forces sufficient to deform the suspended droplets of monomer and/or to damage the polymer bead at any stage of conversion. However, when polymerizing vinyl chloride by such a process, the uniform beads of PVC that are formed are normally clear and glassy in nature and do not have the desired porosity.

There are many cases where porous polymer particles or beads are desirable, such as where the polymer, such as PVC, is to be employed in making plastisols and in extrusion operations. Porous beads would also be desirable to the case of PVC where, because of Government regulations, it is necessary to remove substantially all of the unreacted vinyl chloride therefrom. Porous polymer beads or particles would greatly facilitate such removal. High bulk density is another desirable polymer property because it results in faster extrusion rates, easier handling and shipping advantages.

Thus a process which will produce vinyl resin particles which are spherical, and porous throughout and which have high bulk density is most desirous.

SUMMARY OF THE INVENTION

It has unexpectedly been found that porous, substantially spherical particles of vinyl polymers or resins having high bulk density can be prepared by the suspension polymerization technique by employing a substantially water-insoluble dispersant comprising a substantially unneutralized crosslinked interpolymer of one or more carboxylic acid monomers with a polyunsaturated compound having a plurality of terminally unsaturated polymerizable groups and optionally, a surfactant system comprising at least one surfactant selected from the group consisting of a polyethylene oxide containing surfactant and a non-polyethylene oxide containing surfactant. Excellent results are obtained when both a polyethylene oxide and a non-polyethylene oxide containing surfactant are used in the process of this invention. Rapid stirring or high agitation is used while employing a monomer-soluble free radical yielding polymerization catalyst. The skin that may be formed on the polymer particles is so thin that it allows plasticizers and other compounding ingredients, to rapidly diffuse therethrough into the porous internal structure of said particles.

DETAILED DESCRIPTION

The process of the present invention embodies a suspension polymerization procedure wherein the reaction medium is stirred rapidly during the entire reaction period. With the proper choice of dispersants and surfactants, there is produced spherical, porous and unagglomerated particles of polymer having high bulk density. In the process, water is the polymerization medium and a vinyl monomer to water ratio in the range of about 1.0 to 1.0 to about 1.0 to 10.0 is satisfactory. Preferably a ratio in the range of about 1.0 to 1.0 to about 1.0 to about 4.0 is employed.

The most important and salient feature of the present invention is the colloidal stabilization, or dispersant system, that is employed in the polymerization reaction for the purpose of stabilizing the dispersed monomer droplets against coalescence. The most important component of this system is the substantially unneutralized crosslinked interpolymer of one or more carboxylic acid monomers with a polyunsaturated compound having a plurality of terminally unsaturated polymerizable groups, for example, a crosslinked polyacrylic acid polymer. The crosslinking is necessary in the present invention since an uncrosslinked polyacrylic acid polymer will produce a highly agglomerated charge, or polymerization reaction result, which is most undesirable. The crosslinking is also responsible for making the polymer incapable of forming a true solution in water. In this regard, these polymers are classified as being substantially insoluble in water. Nevertheless, the structure of the interpolymer must be such that it has enough affinity for water to swell appreciably in an aqueous medium, thus thickening the water phase, but not to the extent that it cannot be agitated rapidly. Interpolymers that have little or no affinity for water and do not swell to any measurable degree, are not suitable for the purposes of the present invention.

In addition to the crosslinked interpolymers, just described, which act as dispersion stabilizers, there is employed in conjunction therewith, one or more surfactants. The function of the surfactants is to increase the porosity of the polymer particles and, particularly, to increase the colloidal stability of the polymerization mixture. The use of the crosslinked polymeric dispersant and the surfactant, in conjunction with each other produces a very stable polymerization medium in which the tendency of monomer droplets to coalesce with each other is much less than when using either ingredient by itself. That is to say, a synergism is observed between the carboxyl group—containing crosslinked dispersants and surfactants.

The amount of the water-insoluble substantially unneutralized crosslinked interpolymer useful as a colloidal stabilizer, or dispersant, in the present invention will vary in the range of about 0.02% to about 2.00% by weight, based on the weight of the monomer or monomers being polymerized. Preferably, the amount will be in the range of about 0.03% to about 0.50% by weight. When a water-soluble polyether containing surfactant is employed, it will be used in the range of about 0.0% to about 1.0% by weight, based on the weight of the monomer or monomers being polymerized, and preferably, in the range of about 0.02% to about 0.20% by weight.

The process of the present invention is conducted at a pH in the range of about 3.0 to about 4.3. Inasmuch as the dispersant is a substantially unneutralized crosslinked interpolymer of one or more carboxylic acid monomers, the polymerization reaction is conducted on the acid side.

With respect to the crosslinked polymeric dispersants of the present invention, the carboxylic acid monomers utilizable in preparing the same are those which contain at least one active carbon-to-carbon double bond in the $\alpha, \beta$-position with respect to a carboxyl group thusly

(1)

wherein R' is hydrogen or a —COOH group, and each of R'' and R''' is a hydrogen or a monovalent substituent group which is linked to one of the doubly bonded carbon atoms. Carboxylic acids within this definition include acids, such as acrylic acid, wherein the double bond is terminal thusly

(2)

or the dicarboxylic acids such as maleic acid and other anhydrides of the general structure

(3)

wherein R and R' are monovalent substituent groups and especially those selected from the group consisting of hydrogen and halogen groups and alkyl, aryl, alkaryl, aralkyl, and cycloaliphatic radicals.

Included within the class of carboxylic acids, shown by generic formula (1) above, are widely divergent materials, such as the acrylic acids, such as acrylic acid itself, methacrylic acid, ethacrylic acid, $\alpha$- and $\beta$-chloro and bromo-acrylic acids, crotonic acid, maleic acid, itaconic acid, and many others.

Polymerizable carboxylic anhydrides include any of the anhydrides of the above acids, including mixed anhydrides, and those shown by generic formula (3) above, including maleic anhydride and others. In many cases it is preferred to copolymerize an anhydride monomer with a comonomer, such as methyl vinyl ether, styrene, and the like.

For the purposes of the present invention, it is preferred to employ polymeric dispersants which are derived from polymers produced by the polymerization of the $\alpha, \beta$-monoolefinically unsaturated carboxylic acids. The preferred carboxylic acids are those derived from the acrylic acids and $\alpha$-substituted acrylic acids having the general formula

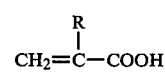

wherein R is a monovalent substituent selected from the group consisting of hydrogen, halogen, hydroxyl, carboxyl, amide, ester, lactone, and lactam.

The most preferred polymeric dispersants are those prepared from the lightly crosslinked interpolymers of acrylic acid. These dispersants are the most efficient. The crosslinking agents which may be employed with any of the carboxylic monomers, or mixtures thereof, may be any compound, not necessarily monomeric in nature, containing two or more terminal polymerizable $CH_2=C<$ groups per molecule. Examples of this class of materials include polyunsaturated-hydrocarbons, -polyethers, -polyesters, -nitriles -acids, -acid anhydrides, -ketones, -alcohols and polyunsaturated compounds of this class incorporating one or more of these and other functional groups. Specifically, there may be utilized divinyl benzene, divinyl naphthalene, low-molecular weight and soluble polymerized dienes, such as polybutadiene and other soluble homopolylmers of open chain aliphatic conjugated dienes, which soluble polymers do not contain any appreciable number of conjugated double bonds, and other polyunsaturated hydrocarbons; polyunsaturated esters, ester-amides and other ester derivatives, such as ethylene glycol diacrylate, ethylene glycol dimethacrylate, allyl acrylate, methylene bisacrylamide, methylene bismethacrylamide, triacrylyl triazine, hexallyl trimethylene trisulfone, and many others; polyunsaturated ethers, such as divinyl ether, diallyl ether, dimethyl allyl ether, diallyl ethylene glycol ether, diallyl, triallyl and other polyallyl ethers of glycerol, butene, -1,2-diol, 1-phenyl-1, 2,3-propanetriol, the polyallyl, -vinyl and -crotyl polyethers containing from two to seven or more of these or other alkenyl ether groupings per molecule and made from polyhydric alcohols, such as the carbohydrate sugars, and the so-called "sugar alcohols", including erythritol, pentaerythritol, arabitol, iditol, mannitol, sorbitol, inositol, raffinose, glucose, sucrose, and many others, and other polyhydroxy carbohydrate derivatives, the corresponding polyalkenyl silanes, such as the vinyl and allyl silanes; and others. Of this large class of crosslinking agents the polyalkenyl polyethers of the carbohydrate sugars, sugar alcohols and other polyhydroxy carbohydrate type derivatives containing from two to seven alkenyl ether groups per molecule are particularly useful. Such materials are easily prepared by a Williamson-type synthesis involving the reaction of an alkenyl halide, such as allyl chloride, allyl bromide, methallyll chloride, crotyl chloride, and the like, with a strongly alkaline solution of one or more of the poly-hydroxy carbohydrate derivatives.

As has been pointed out hereinbefore, the present invention is concerned with using a substantially unneutralized crosslinked interpolymer of one or more carboxylic acid monomers with a polyunsaturated compound having a plurality of terminally unsaturated polymerizable groups as a dispersant in suspension polymerization of vinyl monomers. While the unneutralized crosslinked interpolymers are preferred, it is possible to employ partially or lightly neutralized interpolymers as dispersants in the instant invention. This partial neutralization can be accomplished by adding to the interpolymer, a sufficient amount of an ordinary monovalent alkali, such as sodium hydroxide, potassium hydroxide, ammonium hydroxide, and the like. The amount of neutralization that can be tolerated and still obtain the desirable and beneficial results will be in the range of about 0.0% to about 5.0% by weight, based upon the weight of the dispersant.

In the monomeric mixture, for making the crosslinked resins or polymers employed as colloidal stabilizers or dispersants in the suspension polymerization process of the present invention, the two essential monomeric materials should be present in certain proportions, although the exact proportions will vary considerably depending on the characteristics desired in the polymer. Small amounts of the polyalkenyl polyether copolymerize quite readily with carboxylic monomers and the crosslinking effect of the polyalkenyl polyether on the carboxylic monomer is so strong that as little as 0.1% by weight thereof, based on the weight of the total mixture, produces a great reduction in the water and solvent-solubility of the resulting crosslinked polymer. When 0.1% to 4.0%, more preferably 0.20% to 2.5%, by weight of the polyether is utilized, water-insoluble polymers are obtained, especially with acrylic acids, which are extremely water sensitive. Useful dispersants are also obtained when 0.1% to 6.0%, and preferably 0.2% to 5% of the polyether is copolymerized with maleic anhydride. In the dual copolymer, or two-compound interpolymer, this means that the remainder of the monomeric mixture will be the carboxylic monomer.

The monomeric proportions employed in the production of multi-component interpolymers may vary in a somewhat similar manner. However, it is generally desirable to utilize as much of the carboxylic monomer or monomers and as little of the other monomeric constituents as is consistent with the desired water-insolubility and other properties. In these interpolymers, therefore, the carboxylic monomer or monomers should never be less than 25%, and preferably not less than 40%, by weight of the total monomeric mixture. Multi-component interpolymers may be made from monomeric mixtures comprising from 25% to 95% of a carboxylic monomer, such as acrylic acid, 0.1% to 30% of a polyalkenyl polyether, such as a polyallyl polyether of sucrose, and 5.0% to 74.9% of an additional monomer or monomers. Preferred multi-component interpolymers are the tripolymers resulting from the polymerization of monomeric mixtures containing, respectively, from 40% to 95% by weight of acrylic acid, 0.20% to 2.5% by weight of polyallyl polyether, such as that of sucrose, and 4% to 59% of an additional monomer or monomers, such as maleic anhydride, N-methyl acrylamide, methyl vinyl ether, ethyl vinyl ether, n-butyl vinyl ether, and the like, and mixtures of maleic anhydride, a vinyl alkyl ether, such as vinyl methyl ether, and a polyallyl polyether, in which the sum of the moles of vinyl ether and polyallyl polyether is substantially equivalent to the molar quantity of maleic anhydride present. It should be borne in mind that in the above proportions, if a maximum amount of two of the monomers are utilized, that somewhat less than maximum amounts of the other monomers must be utilized.

Suitable for use as additional monomers in the production of multi-component interpolymers are mono-olefinic vinylidene monomers containing one terminal $CH_2=C<$ group, such as styrene, the chloro and ethoxy-styrenes, etc., acrylamide, N-methyl-acrylamide, N,N-dimethyl acrylamide, acrylonitrile, methacrylonitrile, methyl acrylate, ethyl acrylate, 2-ethylhexylacrylate, methyl methacrylate, vinyl acetate, vinyl benzoate, vinyl pydridine, vinyl chloride, vinylidene chloride, vinylidene chlorobromide, vinyl carbazole, vinyl pyrrolidone, methyl vinyl ether, ethyl vinyl ether, n-butyl vinyl ether, methyl vinyl ketone, ethylene, isobutylene, dimethyl maleate, diethyl maleate, and many others. In addition to the above monoolefinic monomers, many of the divinyl dialkenyl or other polyfunctional esters, amides, ethers, ketones, and the like, may be used in the production of multi-component interpolymers, especially those polyfunctional monomers which nominally function as crosslinking or insolubilizing monomers but which are easily saponified and hydrolyzed to additional hydroxyl, carboxyl and other hydrophilic groups. For example, an interpolymer of acrylic acid and divinyl ether is insoluble in water but upon standing gradually goes into solution probably due to hydrolysis and breaking of divinyl ether crosslinks. The presence of strong alkali or acid speeds dissolution. Spectroscopic analysis confirms the presence in the polymers of non-carboxylic hydroxyls. Similarly, diesters, such as diallyl maleate, ethylene glycol dimethacrylate, acrylic anhydride, betaallyloxy acrylate, and many others, are readily saponified or hydrolyzed by alkali or acid with the introduction of additional hydroxyl and/or carboxyl groups. Of the additional monomers, N-methyl acrylamide, methyl vinyl ether, ethyl vinyl ether and divinyl ether have been found particularly useful in the production of the substantially unneutralized crosslinked interpolymers for use as substantially water-insoluble dispersants in the suspension polymerization of vinyl monomers.

In the invention at least one other surfactant may be optionally employed, along with the water-insoluble crosslinked polymeric dispersant. Among the surfactants that are satisfactory, include the water-soluble, polyether containing nonionic surfactants. Examples of polyether containing nonionic surfactants useful for the purposes of the invention are those falling within the following generic classes: (1) polyoxyethylene alkylphenols; (2) polyoxyethylene alcohols: (3) polyoxyethylene esters of fatty acids; (4) polyoxyethylene alkylamines; and (5) polyoxyethylene alkylamides. As examples of surfactants in the above-named classes there may be named the following: polyoxyethylene (20) sorbitan monooleate, polyoxyethylene (20) sorbitan monolaurate, polyoxyethylene (20) sorbitan monopalmitate, polyoxyethylene (20) sorbitan monostearate, polyoxyethylene (40) stearate, polyoxyethylene (50) stearate, polyoxyethylene esters of mixed fatty and resin acids, polyoxyethylene (20) palmitate, polyethylene glycol monolaurate, polyethylene glycol monooleate, polyethylene glycol ricinoleate, polyethylene glycol monostearate, polyethylene glycol distearate, polyoxyethylene (25) stearate, polyoxyethylene (40) stearate, polyoxyethylene (25) castor oil, polyoxyethylene (52) castor oil, polyoxyethylene (9) laurate, polyoxyethylene (15) tallate, polyoxyethylene (9) lauryl ether, polyoxyethylene (12) lauryl ether, polyoxyethylene (23) lauryl ether, polyoxyethylene (6) tridecyl ether, polyoxyethylene (10) tridecyl ether, polyoxyethylene (10) oleyl ether, polyoxyethylene (20) oleyl ether, polyoxyethylene (50) oleyl ether, polyoxyethylene (15) cetyl stearyl ether, polyoxyethylene (20) stearyl ether, polyoxyethylene (30) stearyl ether, polyoxyethylene (8) tridecyl ether, polyoxyethylene (9) nonyl phenyl ether, polyoxyethylene (21) coconut ester, and the like, etc. The above compounds have a multiplicity of functional groups and accordingly a very large number of modifications is possible. Mixtures of said compounds can also be used. Non-polyethylene oxide containing surfactants may be used together with a polyethylene oxide containing surfactant and the water-insoluble crosslinked polymeric dispersant. The polyethylene oxide containing surfactant may be omitted and the non-polyethylene oxide used as the sole surfactant together with the water-insoluble crosslinked polymeric dispersant. Suitable non-polyethylene oxide containing surfactants are those compounds from the sorbitan ester family or the glycerol ester or polyglycerol ester families, as well as the poly-vinyl alcohols, which do not contain polyethylene oxide segments. As examples of such surfactants there may be named sorbitan trioleate, sorbitan tri-stearate, sorbitan monooleate, sorbitan monopalmitate, glycerol monooleate, glycerol monostearate, triglycerol monooleate, alcotex ®, which is 72.5% hydrolyzed polyvinyl acetate, and the like. The preferred surfactant system is a combination of a polyethylene oxide containing surfactant along with a non-polyethylene oxide containing surfactant.

The polyethylene-oxide containing surfactant is used at a level of about 0 phm (parts per hundred monomer) to about 1.0 phm. Preferably, an amount of about 0.02 phm to about 0.5 phm is used. The non-polyethylene oxide containing surfactant is used at a level of about 0.005 phm to about 0.2 phm, preferably from about 0.02 phm to about 0.1 phm.

In the suspension polymerization procedure, the various ingredients are thoroughly mixed prior to the start of the reaction. That is, the aqueous medium, preferably distilled water, the monomer to be polymerized, such as vinyl chloride for example, the crosslinked polymeric dispersant and the optional surfactants when used, and an oil-soluble catalyst are all mixed together at a temperature below that at which the particular catalyst being used becomes active. While this mixing can be done in a vessel apart from the reaction vessel, for convenience and practical reasons the mixing of the ingredients is done in the polymerization reaction vessel under an inert atmosphere, particularly where the monomer or monomers being employed are subject to oxidation.

The monomer-soluble or oil-soluble catalysts that may be used in the polymerization process of the present invention are the alkanoyl, aroyl, alkaroyl, and aralkanoyl diperoxides and monohydroperoxides, azo compounds, peroxy esters, percarbonates, and other free radical type catalysts. As examples of such catalysts, there may be named benzoyl peroxide, lauryl peroxode, diacetyl peroxide, cumene hydroperoxides, methyl ethyl ketone peroxide diisopropylbenzene hydroperoxide, 2,4-dichlorobenzoyl peroxide, naphthoyl peroxide, t-butyl perbenzoate, di-t-butyl perphthalate, isopropyl percarbonate, acetyl cyclohexane sulfonyl peroxide, disecondary butyl peroxydicarbonate, 5-butyl peroxyneodecanoate, di-normal propyl peroxydicarbonate, azo-bis isobutyronitrile, $\alpha,\alpha'$-azodiisobutyrate, 2,2'-azobis-(2,4-dimethyl valeronitrile), and many others. The particular free radical catalyst employed will depend upon the monomeric material(s) being polymerized, the molecular weight and color requirements of the polymer, the temperature of polymerization, etc. Insofar as the amount of catalyst employed is concerned, it has been found that an amount in the range of about 0.005% to about 1.00% by weight, based on the weight of the monomer or monomers being polymerized, is satisfactory. However, it is preferred to employ an amount of catalyst in the range of about 0.01% to about 0.20% by weight.

While the present invention is specifically illustrated hereinafter with regard to the suspension polymerization of vinyl chloride, it is to be understood that this is merely for purposes of illustration and convenience since the present process may likewise be employed in the suspension polymerization of any polymerizable ethylenically unsaturated monomer or monomers. As examples of such monomers, there may be named other vinyl halides and vinylidene halides, such as vinyl bromide, vinylidene chloride, etc.; vinylidene monomers having at least one terminal $CH_2=C<$ grouping, such as esters of acrylic acid, for example, methyl acrylate, ethyl acrylate, butyl acrylate, octyl acrylate, cyanoethyl acrylate, and the like; vinyl acetate; esters of methacrylic acid, such as methyl methacrylate, ethyl methacrylate, butyl methacrylate, and the like; styrene and styrene derivatives including $\alpha$-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art.

The present invention, however, is particularly applicable to the suspension polymerization of vinyl chloride, either alone or in admixture with one or more other vinylidene monomers having at least one terminal $CH_2=C<$ grouping, copolymerizable therewith in amounts as great as about 80% or more by weight, based on the weight of the monomer mixture.

The suspension polymerization process of the present invention may be carried out at any temperature which is normal for the monomeric material to be polymerized. Usually, a temperature in the range of 0° C. to about 150° C. will polymerize most known monomeric materials useful in the present invention, as set out hereinabove. Preferably, a temperature in the range of about 25° C. to about 100° C. is employed. In order to facilitate temperature control during the polymerization process, the reaction medium is kept in contact with cooling surfaces cooled by water, brine, evaporation, etc. This is accomplished by employing a jacketed polymerization reactor wherein the cooling material is circulated through the jacket throughout the polymerization reaction. This cooling is necessary since most all of the polymerization reactions are exothermic in nature. It is understood, of course, that a heating medium can be circulated through the jacket, if necessary.

One of the most important aspects of the present invention is the agitation or stirring of the reaction medium that is required or necessary during the entire polymerization reaction period, that is, from 0% conversion to completion of the reaction. Prior to the start of the polymerization reaction, the polymerization mixture is agitated to provide shear action to disperse or suspend the monomer(s) in the reaction medium in the form of droplets. These droplets should be of such size that when transformed into polymer particles, which are spherical, and porous, the same will be of the desired size. The polymer particles produced in accordance with the present invention should have a diameter in the range of about 30 microns to about 1000 microns. Preferably, for most end uses, the polymer particles will have a diameter in the range of about 50 microns to about 500 microns.

As pointed out above, it is most important to maintain proper and sufficient agitation throughout the entire polymerization reaction in order to produce the spherical and porous particles of polymer having the proper or desired size. Various means can be employed to get and maintain the proper agitation and shearing action. The reaction vessel or polymerizer is made of stainless steel or glass lined and fitted with a heating and cooling jacket and having a rotatable shaft mounted centrally thereof. On said shaft are mounted one or more agitator blades, which may be flat or curved. Further, one or more baffles are employed which are mounted on the inner wall of the reactor or adjacent thereto. The baffles give an up-and-down, or pumping action to the reaction medium in addition to the circular motion thereof created by the agitator blades.

The amount of agitation desired or necessary to obtain the desired results will vary depending upon the particular monomer or monomers being polymerized, as well as the particular polymer particle size desired in the end product. This means that the rpm (revolutions per minute) of the rotatable shaft carrying the agitator blades must be regulated within certain limits. There are many variables involved in obtaining the optimum conditions for any particular polymerization recipe, such as, for example, the size of the reactor, the number of blades on the rotatable shaft as well as the shape thereof, which will dictate the rpm. to be employed in obtaining the desirable particle size, bulk density and the porosity of the polymer particles. It is to be noted that as the reactor capacity is increased or decreased, adjustment in the length, width and pitch of the blades must be made in order to achieve the desired agitation and shear action. It should also be noted that the agitation and shear action will be influenced by the monomer(s) being polymerized and the temperature of the polymerization reaction.

As pointed out, the rpm of the rotatable shaft carrying the agitator blades will vary over a wide range depending upon the size of the reactor. For example, when using a reactor having a capacity of about 1500 gallons, a rotatable shaft, equipped with a plurality of agitator blades, will be operated at an rpm in the range of about 30 rpm to about 250 rpm to give satisfactory results. In general, when using reactors ranging in size from 30 gallon capacity up to and including 40,000-gallon capacity an rpm in the range of about 10 to about 275 rpm is satisfactory when employing a Pfaudler type mixer or a Helix type mixer. The rpm can be much higher when using small laboratory type reactors, such as one having a capacity of 3 liters, as was used in the specific examples that follow hereinafter.

A more convenient method of describing agitation and shear action is in terms of blade tip speed in terms of feet per second. The tip speed will be the same irrespective of the number of blades mounted on the rotatable shaft. There is a correlation between the rpm of the shaft and the blade tip speed. The tip speed is determined by the following formula:

$$\frac{D(\text{agitator}) \text{ in feet} \times 3.14 \times \text{rpm}}{60} = \text{Tip speed in ft./sec.}$$

wherein D is the diameter of the circle inscribed in the blade or blades. In the following table there is shown the relationship between rpm and blade tip speed in two differentg size reactors using a Pfaudler-type mixer and a helix-type mixer. "D" in the table refers to diameter in feet.

TABLE I

| 30-GALLON REACTOR | | D Reactor | 1.4 ft. |
|---|---|---|---|
| | | D Pfaudler | 1.0 ft. |
| | | D Helix | 1.3 ft. |
| RPM | | TIP SPEED (ft./sec.) | |
| Pfaudler | 50 | | 2.6 |
| | 250 | | 13.1 |
| Helix | 40 | | 2.7 |
| | 200 | | 13.6 |
| 40,000-GALLON REACTOR | | D Reactor | 16 ft. |
| | | D Pfaudler | 8 ft. |
| | | D Helix | 15 ft. |
| RPM | | TIP SPEED (ft./sec.) | |
| Pfaudler | 20 | | 8.3 |
| | 120 | | 50.2 |
| Helix | 10 | | 7.8 |
| | 80 | | 62.8 |

In order to obtain satisfactory results when employing the present invention, the blade tip speed will be in the range of about 2 ft./sec. to about 65 ft./sec. Preferably, a tip speed in the range of about 3 ft./sec. to about 42 ft./sec. is employed.

While the present invention may utilize any of the conventional suspension polymerization techniques, it is possible to utilize a full reactor technique. By full reactor technique is meant that the reaction vessel is completely filled with the polymerization medium at the start of the reaction and kept that way throughout the entire period of the reaction by the constant addition thereto of additional reaction medium ingredients of which are in the same proportion as the startup. Upon the addition of a certain predetermined amount of aqueous polymerization medium, the polymerization reaction is terminated, usually by the addition thereto of a shortstopping agent or by rapid cooling. The necessity for the addition of aqueous polymerization medium is due to the shrinkage in volume of the reaction medium produced by the conversion of the monomer or monomers to the polymeric state.

To further illustrate the present invention, the following specific exaples are given, it being understood that this is merely intended in an illustrative and not a limitative sense. In the examples all parts and percents are by weight unless otherwise indicated.

EXAMPLE I

In this example, a run was made to illustrate the effect of using an uncrosslinked acrylic acid polymer as the dispersant. The polymerization recipe employed was as follows:

|  | PARTS |
|---|---|
| Vinyl Chloride | 100 |
| Water (distilled) | 700 |
| Polyacrylic acid (unneutralized) | 0.67 |
| Surfactant[1] | 0.10 |
| Disecondary butyl Peroxydicarbonate | 0.02 |

[1]Polyoxyethylene (20) sorbitan monooleate

In this run, a three-liter stainless steel reactor, equipped with an agitator having three helical blades, was employed. The polyacrylic acid and water was charged to the reactor followed by the surfactant as a 10% by weight solution in distilled water. The reactor was then closed, swept with nitrogen and evacuated. Then the contents of the reactor were heated and the agitator started and brought to 400 rpm. Then the vinyl chloride, along with the di-secondary butyl peroxydicarbonate as a 10% by weight solution in methenol, was charged to the agitated reaction medium. The temperature in the reactor was adjusted to 55° C. and the reaction started with stirring at 400 rpm throughout. During the course of the reaction, water was continuously added to the reactor to compensate for the shrinkage in volume due to the conversion of monomer to polymer. At 70% conversion the reaction was stopped by rapidly cooling the contents of the reactor and then the reactor was emptied and the polymer recovered in the usual manner. In this case, the charge was a solid chunk and no subsequent tests on the polymer could be run. In fact, the polymer chunk had to be dissolved away in order to clean the reactor. This showed that an uncrosslinked polyacrylic dispersant or colloidal stabilizer does not work to accomplish the objectives of the present invention.

EXAMPLE II

In this example, three runs were made in a three-liter stainless steel reactor using the procedure outlined in Example I. Two different surfactants and a crosslinked polyacrylic acid dispersant were used. Tests were run on the recovered and dried polymers to show the superior results obtained. The temperature of polymerization in these runs was 53° C. and the agitator was varied, as shown in the following table which contains the recipes and test results.

TABLE I

|  | RUN NO. 2 | RUN NO. 3 | RUN NO. 4 |
|---|---|---|---|
| RECIPE | | | |
| Vinyl Chloride | 100 pts. | 100 pts. | 100 pts. |
| Water | 150 pts. | 150 pts. | 150 pts. |
| Dispersant[1] | 0.06 | 0.06 | 0.06 |
| Surfactant[2] | — | 0.04 | 0.05 |
| Surfactant[3] | 0.05 | — | — |
| Di-secondary butyl peroxydicarbonate | 0.02 | 0.02 | 0.02 |
| REACTION CONDITIONS | | | |
| Temperature | 53° C. | 53° C. | 53° C. |
| Agitator Type | Pfaudler | Helix | Helix |
| RPM | 550 | 400 | 400 |
| pH | 3.75 | 3.3 | 3.5 |
| TEST RESULTS | | | |
| Average particle size (μ) | 147 | 135 | 161 |
| Particle size distribution | 30.5% | 29.9% | 31.6% |
| Porosity (cc./gram) | 0.283 | 0.299 | 0.324 |
| Apparent bulk density (gm./ml.) | 0.559 | 0.548 | 0.514 |
| Funnel flow-time (seconds) | 19.2 | 21.9 | 24.3 |

[1]Polyacrylic acid crosslinked with 0.2–0.3 part/monomer of allyl pentaerythritol.
[2]Polyoxyethylene (20) sorbitan monooleate.
[3]Polyoxyethylene (21) coconut ester.

The above results show the greatly improved properties obtained in the polymers produced by the present invention, such as increased porosity.

EXAMPLE III

In this example, a series of runs were made using different crosslinked polyacrylic acid dispersants by themselves without a surfactant. The variable results with respect to porosity show the importance of crosslink density. Again the procedure in Example I was used. The following table contains the recipes and test results.

TABLE II

|  | RUN NO. 5 | RUN NO. 6 | RUN NO. 7 | RUN NO. 8 |
|---|---|---|---|---|
| RECIPE | | | | |
| Vinyl chloride | 100 pts. | 100 pts. | 100 pts. | 100 pts. |
| Water | 150 | 150 | 150 | 150 |
| Disecondary butyl peroxydicarbonate | 0.02 | 0.02 | 0.02 | 0.02 |
| Dispersant A[1] | 0.12 | — | — | — |
| Dispersant B[2] | — | 0.12 | — | — |
| Dispersant C[3] | — | — | 0.12 | — |
| Dispersant D[4] | — | — | — | 0.12 |
| REACTION CONDITIONS | | | | |
| Temperature | 55° C. | 55° C. | 55° C. | 55° C. |
| Agitator rpm | 500 | 500 | 500 | 500 |
| pH | — | 3.9 | 4.0 | 3.75 |
| TEST RESULTS | | | | |
| Average particle size (μ) | 157 | 122 | 149 | 146 |
| Particle size distribution | 27.4% | 28.5% | 27.7% | 27.7% |
| Porosity (cc./gram) | 0.061 | 0.132 | 0.094 | 0.094 |

[1]Polyacrylic acid crosslinked with 0.2–0.3 part/100 monomer of allyl pentaerythritol.
[2]Polyacrylic acid crosslinked with 1.3 parts/100 monomer of allyl sucrose.
[3]Polyacrylic acid crosslinked with 0.7 part/100 monomer of allyl pentaerythritol.
[4]Polyacrylic acid crosslinked with 0.2 part/100 monomer of allyl pentaerythritol.

As can be seen from the above results, the porosity suffers in the absence of a surfactant.

EXAMPLE IV

In this example, a series of 6 runs were made wherein the ingredients in the recipe were varied as was the mixing. The procedure in Example I was followed in each of the runs. The following table contains the recipes and test results.

TABLE III

| | RUN NO. | | | | | |
|---|---|---|---|---|---|---|
| | 9 | 10 | 11 | 12 | 13 | 14 |
| | | | | PARTS | | |
| RECIPE | | | | | | |
| Vinyl Chloride | 100 | 100 | 100 | 100 | 100 | 100 |
| Water | 150 | 150 | 150 | 150 | 150 | 125 |
| Dispersant[(1)] | 0.12 | 0.12 | 0.06 | 0.06 | .06 | .05 |
| Surfactant[(2)] | 0.10 | 0.02 | 0.05 | 0.05 | — | .05 |
| Surfactant[(3)] | — | — | — | — | .075 | .03 |
| Di-secondary butyl peroxydicarbonate | 0.02 | 0.02 | 0.02 | 0.02 | .025 | .025 |
| REACTION CONDITIONS | | | | | | |
| Temperature | 55° C. | 55° C. | 55° C. | 55° C. | 57° C. | 57° C. |
| Agitator type | Helix | Helix | Pfaudler | Helix | Pfaudler | Pfaudler |
| Agitator RPM | 400 | 400 | 600 | 400 | 500 | 475 |
| pH | 4.0 | 3.4 | 3.9 | 3.9 | | |
| TEST RESULTS | | | | | | |
| Average particle size ($\mu$) | 126 | 225 | 134 | 192 | 178 | 157 |
| Particle size distribution (%) | 37 | 34 | 59 | 23 | 42 | 30 |
| Porosity (cc./gram) | 0.298 | 0.308 | 0.309 | 0.275 | 0.162 | 0.297 |
| Apparent bulk density (gm./ml) | 0.554 | 0.554 | 0.541 | 0.566 | 0.639 | 0.533 |
| Funnel flow time seconds | 21.5 | 18.4 | 21.2 | 21.3 | 16.2 | 19.0 |

[(1)] Polyacrylic acid crosslinked with 0.2–0.3 part/100 monomer of allyl pentaerythritol.
[(2)] Polyoxyethylene (20) sorbitan monooleate.
[(3)] Sorbitan monooleate The polymer particles were spherical and of high porosity. Significantly, the percentage of glassy particles obtained was very low. Run No. 14 shows that excellent results were obtained when both a polyethylene oxide containing surfactant and a non-polyethylene oxide containing surfactant were used as the surfactant together with the crosslinked polyacrylic acid dispersant.

There are many advantages in the use of the process of the present invention, such as good agglomeration resistance resulting in spherical, porous particles having high bulk density. The process produces particles having fast funnel flow and high apparent bulk density. The polymer particles have high porosity which results in fast plasticizer uptake. Numerous other advantages will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

I claim:

1. A process for producing spherical particles of polymer having a high porosity which comprises polymerizing in an aqueous medium, in a reaction vessel having an agitator position therein, one or more ethylenically unsaturated monomers having a terminal $CH_2=C<$ grouping in the form of discrete particles having a diameter in the range of about 30 microns to about 1000 microns, said aqueous medium containing a monomer-soluble free radical yielding catalyst, a dispersant comprising a substantially unneutralized, water-insoluble, cross-linked polymer of one or more carboxylic acid monomers with a polyunsaturated crosslinking monomer havng a plurality of terminally unsaturated polymerizable groups, at least one non-polyethylene oxide containing surfactant selected from the group consisting of the sorbitan ester family, glycerol ester family, and polyglycerol ester family, and at least one polyethylene oxide containing surfactant selected from the group consisting of polyoxyethylene alkylphenols, polyoxyethylene alcohols, polyoxyethylene esters of fatty acids, polyoxyethylene alkylamines, and polyoxyethylene alkylamides and polyoxyethylene sorbitan ester, conducting the polymerization at a temperature in the range of about 0° C. to about 150° C. with vigorous agitation in said aqueous medium throughout the entire polymerization reaction.

2. A process as defined in claim 1 wherein the monomer is vinyl chloride.

3. A process as defined in claim 1 wherein the monomer(s) to water ratio is in the range of about 1.0 to 1.0 to about 1.0 to 10.0.

4. A process as defined in claim 1 wherein the dispersant is employed in the range of about 0.02% to about 2.00% by weight, based on the weight of the monomer(s).

5. A process as defined in claim 1 wherein the polymerization reaction is conducted at a pH in the range of about 3.0 to about 4.3.

6. A process as defined in claim 1 wherein the crosslinking monomer is employed in the range of about 0.1% to 4.0% by weight, based on the weight of the monomers used in making the dispersant.

7. A process as defined in claim 1 wherein the dispersant is a lightly crosslinked interpolymer of acrylic acid.

8. A process as defined in claim 1 wherein the dispersant is polyacrylic acid crosslinked with 0.2 to 0.3 part/100 parts of monomer of allyl pentaerythritol.

9. A process as defined in claim 1 wherein the dispersant is polyacrylic acid crosslinked with 1.3 parts/100 parts of monomer of allyl sucrose.

10. A process as defined in claim 1 wherein the dispersant is polyacrylic acid crosslinked with 0.7 part/100 parts of monomer of allyl pentaerythritol.

11. A process as defined in claim 1 wherein the polyethylene oxide containing surfactant is polyoxyethylene (20) sorbitan monooleate.

12. A process as defined in claim 1 wherein the polyethylene oxide containing surfactant is polyoxyethylene (21) coconut ester.

13. A process as defined in claim 1 wherein said agitator is operated at an rpm of from about 10 rpm to 275 rpm with a blade tip speed in the range of from about 2 ft./sec. to about 65 ft./sec.

14. A process as defined in claim 1 wherein said reaction vessel has a capacity of from about 30 gallons to about 40,000 gallons.

15. A process as defined in claim 2 wherein the monomer(s) to water ratio is in the range of about 1.0 to 1.0 to about 1.0 to about 4.0.

16. A process as defined in claim 15 wherein the dispersant is employed in the range of about 0.04% to about 0.50% by weight, based on the weight of the monomer(s).

17. A process as defined in claim 16 wherein the polymerization reaction is conducted at a pH in the range of about 3.0 to about 4.3.

18. A process as defined in claim 17 wherein the crosslinking monomer is a polyalkenyl polyether and employed in the range of about 0.20% to about 2.5% by weight, based on the weight of the monomers used in making the dispersant.

19. A process as defined in claim 18 wherein the dispersant is a lightly crosslinked interpolymer of acrylic acid.

20. A process as defined in claim 19 wherein the dispersant is polyacrylic acid crosslinked with 1.3 parts/100 parts of monomer of allyl sucrose.

21. A process as defined in claim 19 wherein the dispersant is polyacrylic acid crosslinked with 0.2 to 0.3 part/100 parts of monomer of allyl pentaerythritol.

22. A process as defined in claim 1 wherein the non-polyethylene oxide containing surfactant is selected from the group consisting of sorbitan trioleate, sorbitan tristearate, sorbitan monooleate, and sorbitan monopalmitate, glycerol monooleate, glycerol monostearate, and triglycerol monooleate.

23. A process as defined in claim 1 wherein the polyethylene oxide containing surfactant is used at a level of from about 0.005 to about 1.0 parts by weight per 100 parts by weight of the monomer(s).

24. A process as defined in claim 1 wherein the non-polyethylene oxide containing surfactant is used at a level of from about 0.005 to about 0.20 parts by weight per 100 parts by weight of the monomer(s).

* * * * *